United States Patent [19]

Byrnes et al.

[11] Patent Number: 4,930,983
[45] Date of Patent: Jun. 5, 1990

[54] HYBRID HELICOPTER ROTOR HUB RETENTION PLATE

[75] Inventors: Francis E. Byrnes, White Plains, N.Y.; David N. Schmaling, Oxford, Conn.

[73] Assignee: United Technologies Corporation, Hartford, Conn.

[21] Appl. No.: 248,672

[22] Filed: Sep. 26, 1988

[51] Int. Cl.⁵ .............................................. B64C 11/06
[52] U.S. Cl. ................................ 416/134 A; 416/230; 416/244 R
[58] Field of Search .............. 416/244 D, 230, 134 A, 416/244 R, 230 A, 230 R

[56] References Cited

U.S. PATENT DOCUMENTS

| | | | |
|---|---|---|---|
| 3,384,185 | 5/1968 | Fernandez | 416/244 D |
| 4,425,082 | 1/1984 | Mussi et al. | 416/244 D |
| 4,466,774 | 8/1984 | Cycon et al. | 416/244 D |
| 4,521,157 | 6/1985 | Caramaschi et al. | 416/134 A |
| 4,568,244 | 2/1986 | Wehnert et al. | 416/244 D |
| 4,568,245 | 2/1986 | Hibyan et al. | 416/134 A |
| 4,818,179 | 4/1989 | Toner et al. | 416/244 R |

*Primary Examiner*—Robert E. Garrett
*Assistant Examiner*—Hoang Nguyen

[57] ABSTRACT

A hybrid metal composite rotor hub retention plate having high strength and reduced weight. The retention plate comprises a metallic perimeter support structure and a plurality of metallic spokes that extend inwardly from the perimeter structure to a hub. The perimeter structure, hub and spokes define at least three holes. The perimeter structure and spokes have upper and lower surfaces. Fiber reinforced resin matrix composite capable of reacting to bending loads, in-plane shear and axial loads is bonded to the upper and lower surfaces. The hybrid metal composite rotor hub retention plate is made by forming the metal structure and using the metal structure as a mold for the fiber reinforced resin matrix composite.

8 Claims, 4 Drawing Sheets

HYBRID HELICOPTER ROTOR HUB RETENTION PLATE

TECHNICAL FIELD

The field of art to which this invention pertains is helicopter rotor hubs.

BACKGROUND ART

The most significant forces displayed in a helicopter rotor hub assembly are detailed below Flapwise or out-of-plane steady and vibratory shear loads are imparted by the rotor blade in a generally vertical direction and may be equated with vertical lift of the helicopter fuselage. Such loads induce high vertical shear loads within the hub structure.

Flapwise steady and vibratory bending loads are similarly generated by vertical lift loads imparted by the rotor blades and induce compressive and tensile loads within the hub structure generally about an axis in the horizontal axis of the hub. This axis is defined as the flapwise bending neutral axis.

Edgewise or generally in-plane steady centrifugal loads are imparted by the centrifugal forces of each rotor blade. These loads may in certain hub configurations generate a purely axial load, and in others a shear and bending load.

The edgewise shear load associated with centrifugal blade forces is radial in direction (in the horizontal plane) and is generally maximum at the point of blade attachment.

The edgewise bending load due to centrifugal blade forces induce compressive and tensile loads into the hub structure generally about an axis parallel to the vertical. This axis is defined as the edge wise bending neutral axis and is considered to be generally at a right angle or 90 degrees from the flapwise bending neutral axis.

In-plane torsional shear loads imparted to the hub structure by the inertia of a rotor disc (primarily during start-up) and aerodynamic drag are low in comparison to the aforementioned primary loading conditions.

Centrifugal loads migrate from one rotor blade across the hub retention plate to an opposing blade and lift and torque loads migrate from the rotor blades across the hub to the drive shaft. Thus, the major loading conditions experienced by the rotor hub are indeed quite different in origin and orientation. Maximum in-plane and out-of-plane loads are generally located in discrete regions of the hub structure, and are typically very close in proximity due to the desirability of maintaining a small design envelope.

Historically, helicopter main rotor hubs have been made of high strength, lightweight, critical metals or alloys. Metal structures offer generally isotropic strength properties (i.e., the shear, bending and axial strength of the material are constant in all directions) hence, the forming of the hub structure whether by forging, machining or other process does not alter its strength properties. Such properties are desirable from both a manufacturing and structural perspective. The fact that metals can be formed by a variety of well-known techniques offers flexibility in the pursuit of low cost manufacturing methods. In addition, the isotropic and ductile properties of metal make them particularly well-suited for transferring load from the rotor blade to the hub structure. Stress concentrations generated at the interface of bolted or other fastened arrangements in metal structures are generally low in comparison to the stress levels experienced across similar fastening means of composite construction. Thus, metal properties are beneficial in manufacturing and for the transfer of load from one structure to another. Although these metal components have performed adequately, there are a number of drawbacks inherent to these materials. Three important areas where these materials possess less than optimum features are weight, availability and damage tolerance.

Weight reduction has always been a consideration in helicopter construction and with increasing fuel costs it has become a primary objective. At present aluminum and titanium are used extensively because of their light weight and strength, however, there is a constant search for lighter and stronger materials. In addition, since these lightweight metals are primarily available through importation, their supply could be interrupted. Furthermore, these metals may not impart a damage tolerance capability to their components. That is, when a metal component starts to weaken, through fatigue or otherwise, cracks are generated. These cracks continue to grow quickly as there is nothing to stop their propagation and the component part may fail completely.

The industry has taken two approaches in order to overcome the shortcomings of such metal components. One is to build a redundant component so that should one fail, the other will allow for safe landing. The second is to overdesign the particular part such that it would have much greater strength than would normally be required under normal circumstances. Both of these approaches add weight to the aircraft as well as increased cost and reliance on critical metals.

Recently, composite materials have been used as replacement parts for many metal components due to their light weight and relatively low cost. For example, composite materials are now being used in main structural components such as main rotor blades and tail rotor assemblies on helicopters. Fiber reinforced composite matrix materials such as those composed of graphite fibers offer even greater strength than the most comparable metal (e.g. Titanium) and exhibit even lower specific weight properties. The predominant weight advantages of such materials resides in the ability to orient the strength of the fibers in the direction of the load.

In addition, composite articles having fibers oriented in at least two directions (e.g., a structure comprised of a multi-laminate stack of woven fabric) may have discontinuous fibers, which can produce residual interlaminar shear stress. The latter, "free edge" effect, is apparent, for example, when fibers within the composite are off-axis (e.g., 0/90 degrees) rather than unidirectional and is due to the longitudinal and lateral strain properties of the fibers. For example, laterally oriented fibers resist the strain of longitudinal fibers when a load is applied in a longitudinal direction. Hence, residual stress is generated within the resin matrix between the fibers. The general solution in the industry has been to provide continuous fibers where possible for mitigating the concentration of shear stress developed along free edges of the structure.

In addition, typically a compromise between the weight advantage composites offer for the ability to competitively manufacture the composite articles has been made. For example, the fibers oriented in one region of a structure, in an effort to utilize a low-cost composite braiding technique in addition to maintaining continuous fibers, may not be optimum (oriented properly) for accommodating loads in an adjacent region and vise-versa. However, it is not always practical to replace a metal component with a composite material due to particular design considerations and shortcomings in the composite physical properties.

Composite rotor hubs have been designed using a laminated structure of fiber reinforced resin (e.g., note British Pat. No. 2,092,541). Commonly assigned U.S. Pat. No. 4,568,245 describes another composite main rotor hub. Such hubs are of such complicated design as to make them costly to fabricate, and having fewer component parts, produce an increased number of failure points.

Thus, there is still a constant effort being expended in this art to develop damage tolerant, relatively inexpensive and lightweight composite components capable of withstanding the highly loaded complex forces developed in a helicopter rotor hub assembly.

DISCLOSURE OF INVENTION

This invention is directed to provide a hybrid metal/composite hub retention plate having high strength and reduced weight.

The retention plate comprises a metallic perimeter support structure and a plurality of metallic spokes that extend inwardly from the perimeter structure to a hub. The perimeter structure, hub and spokes define at least three holes. The perimeter structure and spokes have upper and lower surfaces. Fiber reinforced resin matrix composite capable of reacting to bonding loads, in-plane shear and axial loads is bonded to the upper and lower surfaces.

Another aspect of the invention is a method of making a hybrid metal composite helicopter rotor hub retention plate where the plate acts as a mold for the composite. A metallic support plate is formed. The plate includes a perimeter structure and a plurality of metallic spokes that extend inwardly to a hub. The perimeter structure, hub, and spokes have a web disposed between upper and lower flanges and an upper surface disposed on the upper flange and a lower surface disposed on the lower flange. At least two retention ridges extend from the upper flange and at least two retention ridges extend from the lower flange. Fiber reinforced resin matrix composite capable of reacting to bending loads, in-plane shear and axial loads is molded to the upper and lower surfaces between the respective retention ridges.

Other features and advantages will be apparent from the specification and claims and from the accompanying drawings which illustrate an embodiment of the invention.

BEST MODE FOR CARRYING OUT THE INVENTION

Figure 1:
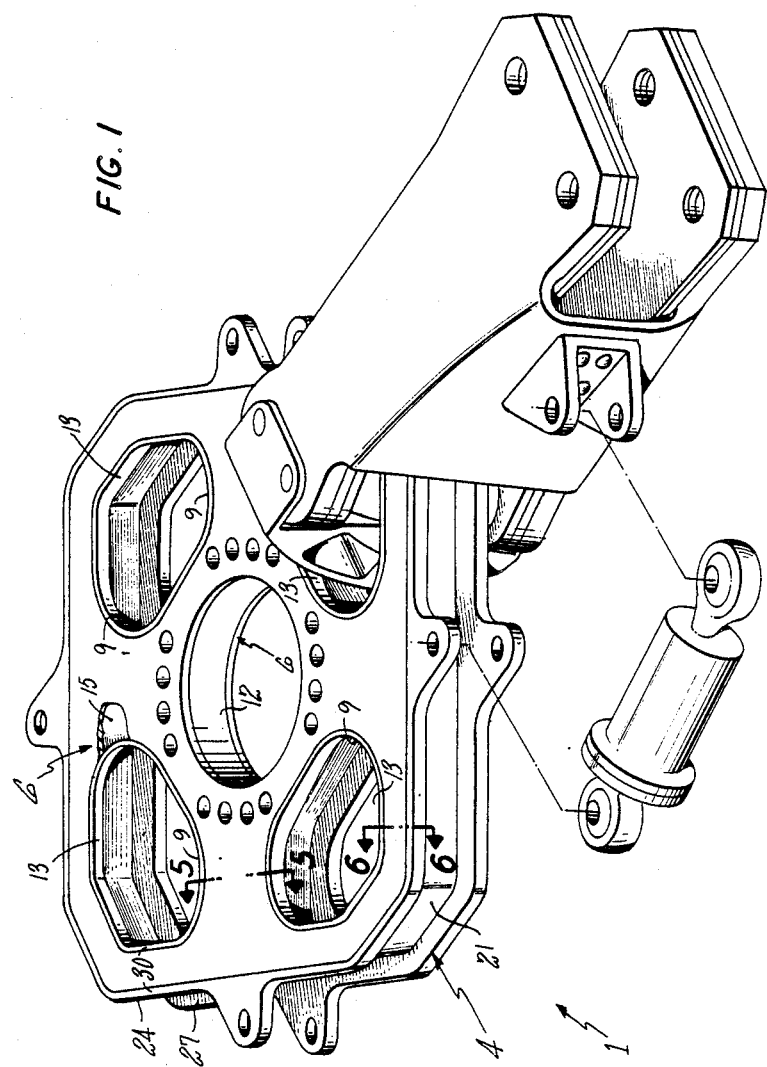
FIG. 1 illustrates a perspective view of the hybrid retention plate of this invention.

According to FIG. 1, a retention plate 1 for a helicopter rotor hub has a formed metallic perimeter support structure 4 which carries the predominant shear loads. The perimeter structure 4 serves as support for the composite 6 which carries the predominant bending loads. Metallic spokes 9 extend inwardly from the perimeter support structure 4 to a central hub 12 for connection to a rotor shaft. Typically, there are at least four spokes 9 connecting the perimeter support structure 4 with the hub 12. This provides four holes 13 for securing elastomeric bearings to which each of four rotor blades is attached. However, other configurations could be used such as 3, 5, 6, etc. spokes. The composite 6 is bonded to the upper surface 15 and the lower surface 18 of the perimeter support structure 4. The metal used in the perimeter structure 4 or the spokes 9 can be any of a variety of high strength metals and alloys thereof such as titanium, aluminum, lithium, steel or alloys thereof. Typically, the metal structure is made by forging the structure and machining surfaces where higher tolerances are required.

The perimeter structure 4 and the spokes 9 can have a variety of cross-sectional shapes. One exemplary efficient shape is a web 21 disposed between upper and lower flanges 24 and 27. The web 21 is substantially perpendicular to the plane of the rotor hub. The flanges 24 and 27 are substantially parallel to the plane of the rotor hub. The web 21 and flange 24,27 shape provides surfaces for supporting the composite 6 that is efficiently tied to the load carrying web 21. Although the web 21 may be connected to the flanges at a variety of points along the cross-section of the flanges a shape that substantially resembles an I beams acts to balance the retention plate 1. Typically, the web 21 is not connected to the flanges at the same point along the length of the perimeter structure 4 and the spokes 9 in order to optimize the shear and torsional capability of the section.

The upper surface 15 is disposed on the upper flange 24 and the lower surface 18 is disposed on the lower flange 27. Although the upper surface 15 and lower surface 18 are typically disposed on the top of upper flange 15 and the bottom of lower flange 18 alternative configurations are possible. Thus, it may be envisioned that the composite 6 may be bonded to the top of the upper flange 24 or the bottom of upper flange 24 and composite 6 may be bonded to the bottom of the lower flange 27 or the top of the lower flange 27. An alternate and preferable fabrication technique is to cure the composite directly upon the flanges of the hub structure, using the hub structure as the hard tooling surface for compaction of the laminates. Hence, the assembly operation of curing the laminates and forming a strong structural bond is achieved in a single step.

Retention ridges 30 extend substantially perpendicular from the flanges 24 and 27 providing retaining walls for forming and holding the composite 6. In addition, the retention ridges 30 reduce free edge effects (stresses) in the fiber matrix since the loads are transferred to the retention ridges 30. The retention ridges 30 can have a draft angle which provides a means to maintain the wraps on the flanges. Furthermore, the retention ridges 30 increase the bending stiffness of the sections.

Finally, the vertically oriented ridges provide additional shear area across the horizontal bond plane. While the bond plane is intentionally located in regions of low shear stress, this particularly critical area is strengthened by the metal ridge structure which intersects the bond shear plane. These and other beneficial aspects of the ridges will be discussed in further detail hereinafter.

Figure 2:
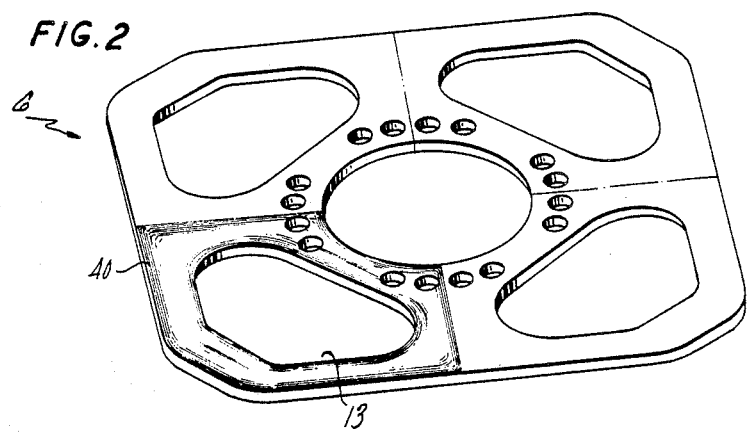
FIG. 2 illustrates a top view of an exemplary composite layer.
Figure 3:
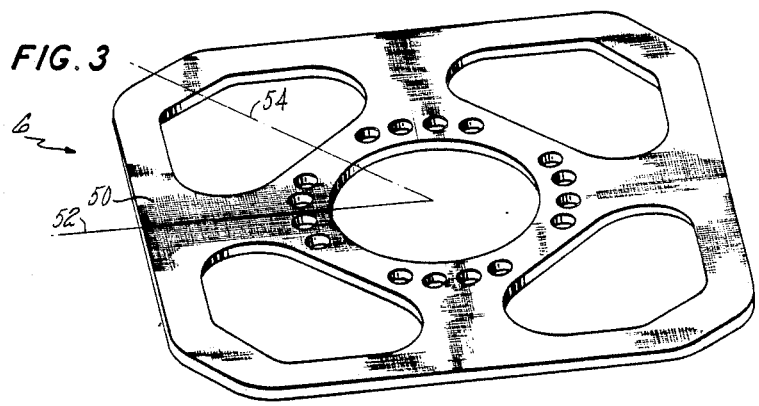
FIG. 3 illustrates a top view of another exemplary composite layer.
Figure 4:
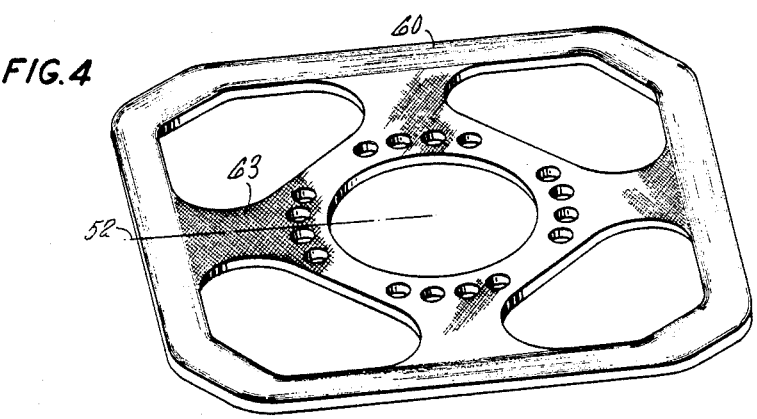
FIG. 4 illustrates a top view of yet another exemplary composite layer.

FIGS. 2, 3, and 4 illustrate three exemplary composite layers that are bonded to the metallic structure to form the hybrid retention plate. These layers or a variety of other layers may be used alone or in various combinations depending upon the particular properties desired. The three composite layers may be stacked in a variety of configurations which conveniently facilitate thickness build-up. Preferably adjacent layers are stacked so that their moduluses are substantially similar as this aids in abating delaminations. Thus, the cost efficiency of laying pairs of a particular layer may be chosen over a more structurally efficient homogeneous 3-ply alternating configuration. Typically, the layers are about 0.2 cm to about 0.4 cm thick and alternated so that about 6 layers to about 30 layers are used.

According to FIG. 2, continuous unidirectional S-Type fibers 40 are wound around the holes 13 (provided by the hub 12, spokes 9, and perimeter structure 4) and between the retention ridges 30. This layer is sized to resist centrifugal blade force, in-plane, and out of plane bending, and also to provide damage tolerance.

FIG. 3 depicts the second layer of composite. In this layer graphite fibers 50 are oriented at 0/90° ±10° relative to a first radial line 52 through the spoke region. This layer is disposed on the perimeter structure 4, hub 12 and spokes 9. The layer acts to tie together the plurality of wraps in the first layer. A second radial line 54 represents the radial direction of centrifugal load imparted by a rotor blade. This layer yields ±45 degree fibers as a result of the designated orientation relative to the radial line 54 and spokes of the hub. This orientation is beneficial, since in-plane shear loads, due predominately to centrifugal loads imparted by the rotor blades, are highest in these regions and are bets reacted as a tensile load in the fibers. Finally, this laminate increases the bending strength for the spokes 9.

FIG. 4 illustrates the third layer. This layer comprises two composite laminates. The first is continuous unidirectinal S-Type fibers 60 oriented around the perimeter structure. This first laminate acts to provide a redundant load path for carrying in-plane centrifugal blade loads. This continuous fiber perimeter ring is capable of reacting the centrifugal blade loads should damage occur to the metal hub structure. This laminate also provides perimeter hoop stiffness to the hub. Thus, the second and third layers, (see FIGS. 3 and 4) combine to form a continuous ring of 0/±45/90, ±10 degree fibers in the central hub region. Such orientation is desirable for achieving isotropic properties facilitating bolted attachment of a drive shaft to the retention plate.

FIG. 4 also illustrates the second laminate of the third layer. It comprises 0/90 degree ±10 degree graphite fiber 63 that are disposed on the spokes and hub area. These fibers are oriented 45±10 degrees to radial line 52 and to the fibers 50 of the second layer.

While the particular composite materials referenced above, i.e., S-glass and graphite, are set forth as those preferable for yielding a high strength, damage tolerant retention plate, other composite fiber materials of higher or lower modulus may be substituted for or intermixed therewith for achieving different structural goals. For example, graphite fibers may be utilized for all layers of the composite construction for enhancing the overall strength, however, damage tolerance of the structure will tend to suffer (i.e., high elongation fibers are preferable for damage tolerance).

As the graphite fiber reinforcement, high strength graphite fiber may be used which has a minimum filament modulus of $24 \times 10^6$ psi. These filaments may be purchased preimpregnated with an epoxy resin in the form of a multifilament collimated graphite tape in sheet form from Narmco Materials Inc., Costa Mesa, California. The cured graphite/resin composite preferably contains about 45% to about 65% fibers by volume and a unidirectional cured layer should have a minimum tensile strength of 130,000 psi and a minimum tensile modulus of about $17 \times 10^6$ psi.

As the glass fiber reinforcement high strength glass fibers may be used which have a minimum filament modulus of $8 \times 10^6$ psi. The preferred glass fiber is an S-type which can also be obtained preimpregnated with epoxy resin from Narmco Materials Inc. The cured glass fiber/resin layer preferably has about 45% to about 65% fiber content by volume and a tensile strength of about 80,000 psi minimum as well as a minimum longitudinal tensile modulus of about $4 \times 10^6$.

The epoxy resin matrix should be selected so as to be compatible with the fiber reinforcement. It is also preferable that the epoxy resin be satisfactorily curable at low pressures, i.e., about 20 to about 100 psig. Three such resin systems are available commercially, two from U.S. Polymeric designated as Resin Number 773 and Resin Number E7K8, and the other from Narmco Materials Inc. designated as Resin Number 5225.

The graphite fibers can be laid up and subsequently treated with the epoxy resin either by brushing or otherwise applying a coating composition of suitable carrier of the epoxy resin or resin coated just prior to laying up, the fibers are preferably laid up as commercially purchased, i.e., preimpregnated with the epoxy resin.

In laying up the fibers for the retention plate, the amount of graphite fibers are preferably at least equal to the amount of fiberglass fibers in the composite. While an excess of graphite fibers can be tolerated, an excess of fiberglass is not desirable, especially in a series of adjacent sheets. Ideally, the thicknesses of graphite fiber layers are equal to the thicknesses of adjacent glass fiber layers through the composite plate.

As shown in FIG. 2, the glass fibers are laid up in four discrete sections, each section made up of a continuously wound glass fiber bundle, helically wound around the central axis of retention. The unidirectional fiberglass wafers are filament wound around a mandrel that is shaped to the retention cavity dimensions. When these sections are thus formed, they are formed such that the internal load path will always be along the length of the fibers. Similarly, the glass fibers in the perimeter ring of layer 3 (FIG. 4) are also helically wound. Each layer of graphite or fiberglass are cut to size with all of the major cavities cut out, using a clicker die. The graphite and fiberglass layers are then assembled according to FIGS. 2, 3 and 4 and layered between the retention ridges.

The layered assembly is then molded to proper thickness using a time/temperature/pressure distribution established for the resin system being used. Typically, epoxy resin systems are used which cure at about 340° F. to about 360° F., at pressures of about 60 psig to about 100 psig in about 2 to about 4 hours. The result is a main hub plate requiring only upper surface grinding for fine tolerances, reaming of the center hole and drilling of the attachment holes. (In view of the upper surface grinding, typically a nonsymmetrical excess of graphite will be laid up in the uppermost portion of the plate to account for such grinding.

Figure 5:
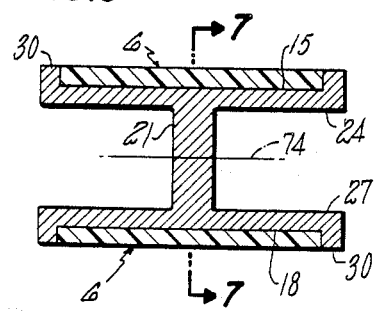
FIG. 5 illustrates a sectional view of FIG. 1 taken across line 5—5.
Figure 7A:
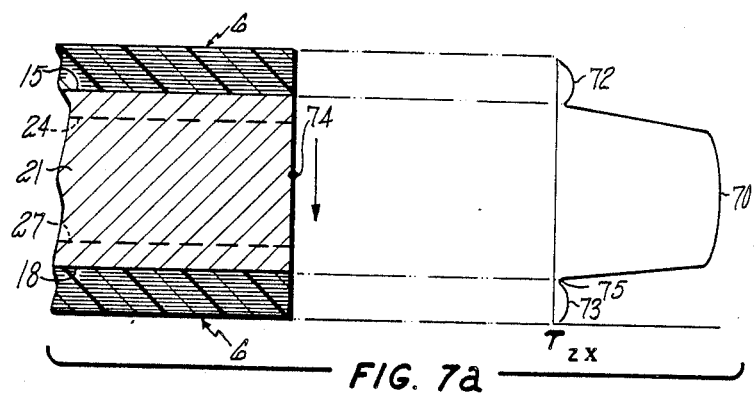
FIG. 7a illustrates a sectional view of FIG. 5 taken across line 7—7 and includes a graphically illustrated plot of the flapwise shear load (stress) distribution acting along line 7—7.

FIG. 5 depicts a sectional view 5—5 of FIG. 1 across the spokes 9 where the predominant loading condition is flapwise shear and bending induced by vibratory blade loads. Shear loads in this region are essentially carried in the metallic web 21 (along its width) and the majority of bending loads are reacted by the upper and lower composite matrix 6. FIG. 7a is a sectional view taken across line 7—7 of FIG. 5 and includes curves 70, 72 and 73, depicting the approximate shear load distribution acting along line 7—7 (the direction of the shear load vector is indicated by the downwardly pointing arrow along the section edge). The shear distribution curve 70 shows that the metallic web reacts substantially all of the shear loads while curves 72 and 73 show that the upper and lower composite matrix experiences only a fraction of the total shear load. Since the layers are stacked, there exists planes of resin therebetween which are essentially unreinforced by fibers; hence for minimizing shear stress in the planes, the composite matrix is preferably located as far as possible from the flapwise bending neutral axis 74 (shown as a straight line in FIG. 5 and as a point in FIG. 7a). Furthermore, it is interesting to note the level of bond line stress at point 75 where curves 70 and 73 intersect. The low magnitude of stress is again affected by location of the bond line away from the flapwise bending neutral axis and is additionally reduced by the load bearing capability of the retention ridges.

Figure 7B:
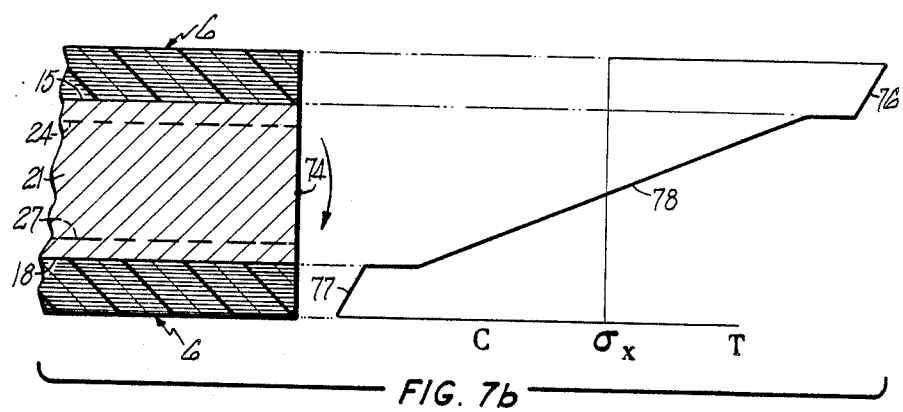
FIG. 7b illustrates a sectional view of a FIG. 5 taken across line 7—7 and includes a graphically illustrated plot of the flapwise bending load (stress) distribution acting along line 7—7.

FIG. 7b is a sectional view also taken across line 7—7 of FIG. 5 and depicts the approximate bending load distribution acting along the line 7—7. Curves 76, 77 and 78 are graphical illustrations of the bending stress within the upper and lower composite matrix and metallic web, respectively (the sense of the bending moment is indicated by the arrow along the section edge). The composite matrix reacts nearly all the steady and vibratory bending loads while the web 21 and flanges 24, 27 experience only a small percentage of the total bending load. This result is attributed to the unidirectional fibers 40 and the 0 degrees fibers of the first and second layers of the composite matrix. So oriented, these fibers efficiently react bending loads by providing high bending stiffness and strength in the upper and lower regions of maximum bending strain.

Figure 6:
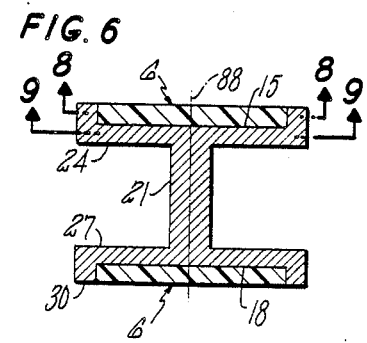
FIG. 6 illustrates a sectional view of FIG. 1 taken across line 6—6.
Figure 8A:
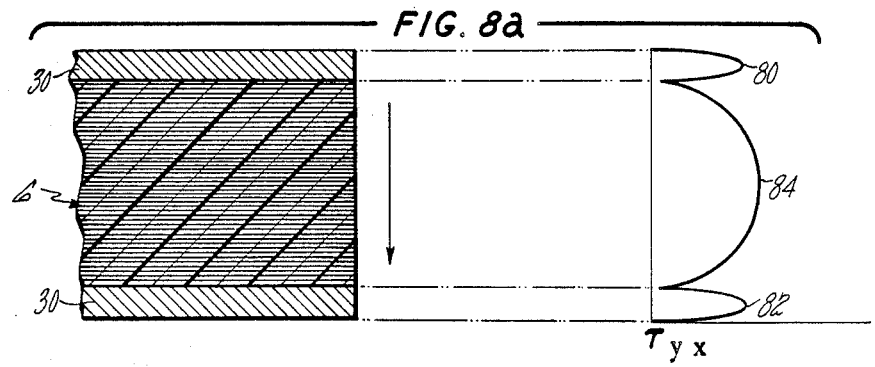
FIG. 8a illustrates a sectional view of FIG. 6 taken across line 8—8 and includes a graphically illustrated plot of the edgewise shear load (stress) distribution acting along line 8—8.

FIG. 6 shows a sectional view across line 6—6 of FIG. 1 across the perimeter surface 4 at the region of maximum in-plane loading generated by rotor blade centrifugal loads. In-plane shear loads in this region can be shared by both the metal flanges 24, 27 and the composite matrix 6 since the lay-up yields a fiber orientation of ±45 degrees as seen in FIG. 3. FIG. 8a is a sectional view taken across line 8—8 of FIG. 6 and includes curves 80, 82 and 84 depicting the approximate shear load distribution acting along line 8—8 (the radially inward direction of shear load reaction is indicated by the downwardly pointing arrow along the section edge). Curves 80 and 82 are indicative of the shear load distribution across the retention ridges while curve 84 is that distribution solely within the composite matrix 6.

Figure 9A:
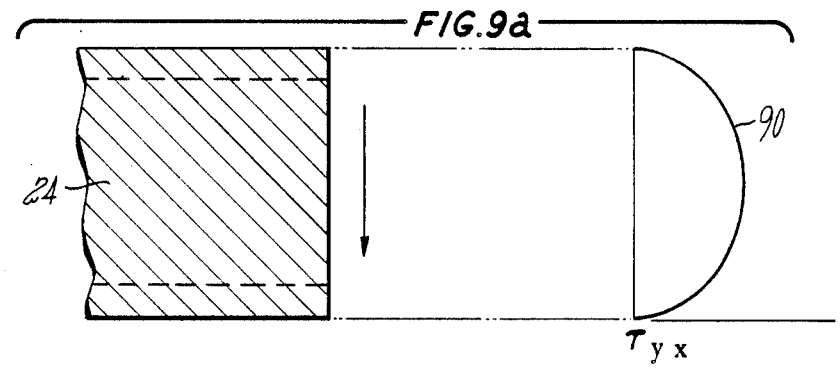
FIG. 9a illustrates a sectional view of FIG. 6 taken across line 9—9 and includes a graphically illustrated plot of the edgewise shear load (stress) distribution acting along line 9—9.

FIG. 9a shows a sectional view taken across line 9—9 of FIG. 6. and includes curve 90 depicting the approximate shear load distribution acting along line 9—9 within flange 24. (the direction of shear loading is indicated by the arrow along the section edge). Curves 80, 82, 84 and 90 illustrate that, while a slightly greater proportion of shear loading is carried within the metal flange structure, indicated by curve 90, (the magnitude of the load along each line is the total area under the curve(s)) both metal and composite share in reacting in-plane shear as seen by comparison of the area under curve 84.

Figure 8B:
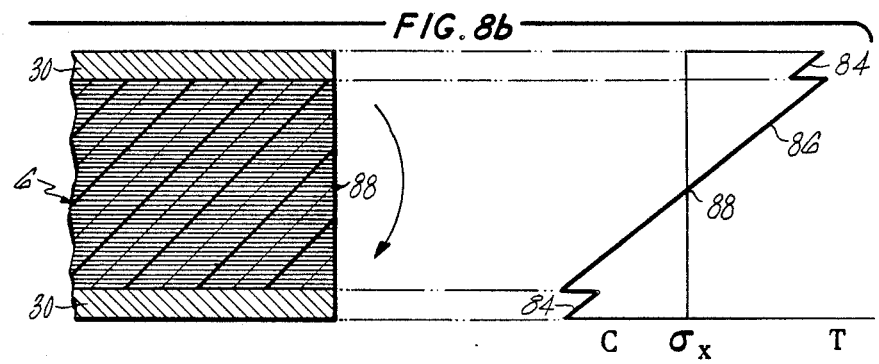
FIG. 8b illustrates a sectional view of FIG. 6 taken across line 8—8 and includes a graphically illustrated plot of the edgewise bending load (stress) distribution acting along line 8—8.
Figure 9B:
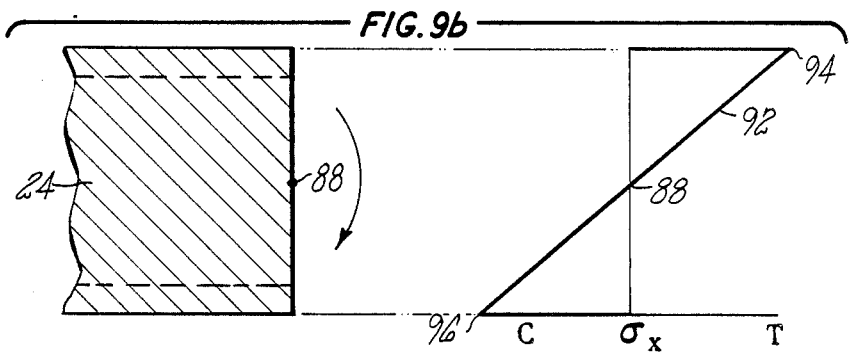
FIG. 9b illustrates a sectional view of FIG. 6 taken across line 9—9 and includes a graphically illustrated plot of the edgewise bending load (stress) distribution acting along line 9—9.

FIGS. 8b and 9b depict the approximate bending load distribution acting along the same lines 8—8 and 9—9 at FIG. 6. Sloped lines 84 and 86 of FIG. 8b are, respectively, the approximate bending load distribution curves associated with the retention ridges 30 and the composite matrix 6 (the sense of the bending moment is indicated by the arrow along the section edge). The curves illustrate that maximum in-plane bending loads are shared by the metal flanges and the composite matrix. The unidirectional fibers 40 and 60 discussed earlier in referencing FIGS. 2 and 4 react in-plane bending loads as conjunction with the metal retention ridges 30. The latter adds bending stiffness as far as practicable from the edgewise bending neutral axis 88 (shown as a vertical line in the metallic web in FIG. 6 and a point FIG. 8b) without significantly increasing flange width. Curve 92 of FIG. 9b shows the approximate bending load distribution across flange 15, the peaks 94 and 96 thereof are reduced in accordance with the stiffness (in the X-direction) of the composite matrix.

The hybrid retention plate of this invention improves on the all composite retention plate described in Pat. No. 4,568,245. It has been found that although that retention plate was quasi-isotropic in most dimensions the ability to react to shear loads could be improved. This invention reduces the probability of composite interlaminar shear failure by introducing a metallic member to react to the shear loads. The composite portion remains with its advantages of greater damage tolerance, light weight, and ability to carry bending loads. In addition the I-beam shape is used in an unexpected configuration to provide a support structure for the composite. Typically, an I-beam shape is used 90 degrees offset from its present use when reaction to in-plane shear loads is desired. Finally, the use of the metal support structure simplifies the fabrication of the shaft and blade attachments.

In accordance with the foregoing objectives, the present invention provides weight efficiency via strategic placement of composite fibers to match the structural requirements in each region of the retention plate. In summary, the upper and lower composite matrix yields ±45 degree fibers in the blade attachment region along (radial line 54) for reacting in-plane shear loads, while also also producing 0,/±45 degree fibers in the central hub region for accommodating its bolted attachment to a drive shaft. The unidirectional fibers in the spoke region serve to efficiently react flapwise bending loads, while these same fibers, with the aid of the continuous unidirectional fiber ring in the perimeter region, carry in-plane bending loads. Furthermore, the continuous unidirectional fiber ring enhances the damage tolerance of the hub by providing a redundant centrifugal load path.

The present invention advantageously utilizes the shear strength, isotropic and ductile properties of metal by providing a shear web structure in the spoke region and flange structures in the perimeter region for reacting maximum flapwise and edgewise shear loads in the respective hub regions. The metal perimeter portion of the hybrid retention plate to which the rotor blades are fastened provides an efficient load path for transfer of blade loads into both the metal spokes/central hub and the upper and lower composite matrix. The metal retention ridges reduce bond line stress across the bond plane of the composite matrix and metal flange structures, while additionally enhancing the in-plane and out-of-plane bending stiffness. Furthermore, the metal retention ridges reduce residual interlaminar shear stress in the composite matrix (contained between the ridges) by providing a load path for stresses along the edges thereof to migrate into the metal flange structure.

Finally, the hub configuration of the present invention also facilitates the use of commonly practiced low-cost manufacturing techniques. For example, the hub may be forged and machined to final shape while the composite laminates hand or tape-laid upon the metal flange structures and cured, or, alternately, cured separately and bonded thereto.

It should be understood that the invention is not limited to the particular embodiments shown and described herein, but that various changes and modifications may be made without departing from the spirit and scope of this novel concept as defined by the following claims.

We claim:

1. A main helicopter rotor hub retention plate said retention plate comprising;
   a. a metallic perimeter support structure said structure having an upper surface and a lower surface;
   b. a plurality of metallic spokes extending inwardly from said perimeter structure to a hub, said spokes having an upper surface and a lower surface, said perimeter structure, hub and spokes defining at least three holes;
   c. said perimeter structure and spokes having a web disposed between upper and lower flanges said web substantially perpendicular to the plane of the rotor hub and said upper and lower flanges substantially parallel to said rotor hub, said upper surface disposed on said upper flange and said lower surface disposed on said lower flange, and said perimeter structure and spokes having a cross-section that is substantially I-shaped;
   d. fiber reinforced resin matrix composite bonded to said upper surface, said composite capable of reacting to bending loads, in-plane shear and axial loads; and
   e. fiber reinforced resin matrix composite bonded to said lower surface, said composite capable of reacting to bending loads, in-plane shear and axial loads.

2. The retention plate as recited in claim 1 wherein said composite comprises at least one layer of continuous unidirectional wound fiber having an orientation of about 0±10 degrees, said fibers wound around said holes.

3. The retention plate as recited in claim 2 wherein said composite comprises at least one layer of 0/90±10 degrees fiber.

4. The retention plate as recited in claim 3 wherein said composite comprises at least one layer said layer comprising continuous unidirectional wound fiber having an orientation of about 0±10 degrees wound around said perimeter structure.

5. The retention plate as recited in claim 4 wherein said layer has 0/90±10 degrees fiber disposed on said spokes and hub.

6. The retention plate as recited in claim 1 wherein at least one upper retention ridge extends substantially perpendicular from said upper flange and away from said web and is bonded to and retains said composite and at least one lower retention ridge extend substantially perpendicular from said lower flange and is bonded to and retains said composite.

7. A method of making a main helicopter rotor hub retention plate comprising;
   a. forming a metallic support plate said plate comprising:
       (i) a metallic perimeter structure having an upper surface and a lower surface;
       (ii) a plurality of metallic spokes extending inwardly from said perimeter structure to a hub, said spokes having an upper surface and a lower surface, said perimeter structure, hub and spokes defining at least three holes;
       (iii) said perimeter structure and spokes have a web disposed between upper and lower flanges said web substantially perpendicular to the plane of the rotor hub and said upper and lower flanges substantially parallel to said rotor hub, said upper surface disposed on said upper flange and said lower surface disposed on said lower flange; and
       (iv) at least two spaced apart upper retention ridges extending substantially perpendicular from said upper flange and away from said web and at two spaced apart lower retention ridges extending substantially perpendicular from said lower flange;
   b. molding fiber reinforced resin matrix composite to said upper surface between said retention ridges, said composite capable of reacting to bending loads, in-plane shear and axial loads; and
   c. molding fiber reinforced resin matrix composite to said lower surface between said retention ridges, said composite capable of reacting to bending loads, in-plane shear and axial loads.

8. A main helicopter rotor hub retention plate said retention plate comprising;
   a. a metallic perimeter support structure said structure having an upper surface and a lower surface;

b. a plurality of metallic spokes extending inwardly from said perimeter structure to a hub, said spokes having an upper surface and a lower surface, said perimeter structure, hub and spokes defining at least three holes;
c. said perimeter structure and spokes having a crossection that is substantially I-shaped;
d. fiber reinforced resin matrix composite bonded to said upper surface, said composite capable of reacting to bending loads, in-plane shear and axial loads; and
e. fiber reinforced resin matrix composite bonded to said lower surface, said composite capable of reacting to bending loads, in-plane shear and axial loads.

* * * * *